United States Patent

[11] 3,557,716

[72] Inventor Sven Birger Westin
 74 Skarsgatan, Goteborg, Sweden
[21] Appl. No. 741,737
[22] Filed July 1, 1968
[45] Patented Jan. 26, 1971

[54] CONFECTIONERY MOULD
 6 Claims, 1 Drawing Fig.
[52] U.S. Cl. ................................................. 107/8,
 118/21, 141/45, 141/67
[51] Int. Cl. ................................................. A23g 1/20
[50] Field of Search ............................................ 18/30AM,
 Bottle Cap Seal(Digest), (Inquired); 118/21, 63,
 411; 117/2; 141/67, 45

[56] References Cited
 UNITED STATES PATENTS
 1,503,527 8/1924 Dumas ........................ 118/21
 2,827,009 3/1958 Norris ........................ 118/317

3,413,143 11/1968 Cameron et al. ............ 118/411X

Primary Examiner—Laverne D. Geiger
Assistant Examiner—Robert I. Smith
Attorney—Holman, and Stern ABSTRACT: Hollow confectionery articles are manufactured by injecting a flowing confectionery material into an open mould, usually consisting of a series of recesses pressed in a thin sheet of synthetic resin. It is desirable that the confectionery material shall not be permitted to smear the upper surface of the mould between the recesses.

The injection is brought about by means of an apparatus having a head extending into the recess during the filling operation, and being tightly pressed against the mould around the recess being filed. The head is provided with a cavity for surplus confectionery material, and compressed air is injected into the recess together with the confectionery material to augment the uniform spreading of the confectionery material over the walls of the recess and to force the surplus into the cavity to be collected in a container.

PATENTED JAN 26 1971
3,557,716
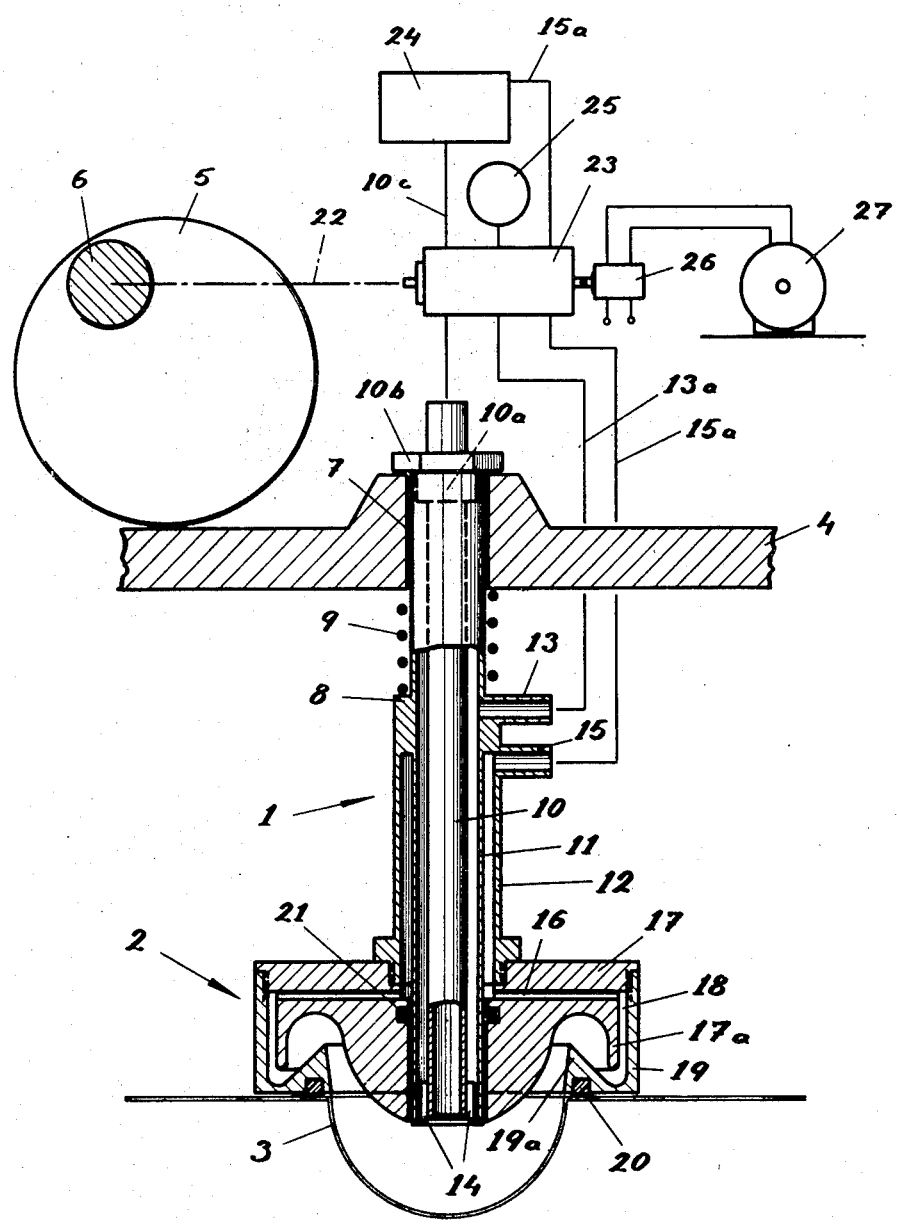
INVENTOR
S. B. WESTIN
By Glascock, Downing & Seebold
ATTORNEYS

CONFECTIONERY MOULD

The present invention refers to the moulding of confectionery material, preferably chocolate, in open moulds to provide thin-walled shells adapted during a following operation to be filled with a different edible substance.

The manufacture of such shells has hitherto been arranged by filling a mould having a large number of recesses with, say molten chocolate, to the brim whereupon the mould has been turned upside down in such a manner that surplus material could flow out of the recesses. The mould is cooled, usually by air being blown unto the underside thereof, whereby the remaining chocolate sets and forms the desired shells as a covering of the walls of the recesses. The mould is thereafter permitted to pass a raking device which scrapes off surplus material on the top of the mould.

The metal moulds necessary for this procedure are very expensive, and a trend in the confectionery industry has been to turn towards moulds made from a series of depressions in a thin sheet or foil of a plastic material such as synthetic resin. The latter may be transparent, and the moulds are so inexpensive that they may be used for one moulding operation only, and thereafter form part of the wrapping for the finished article. To obtain the wrapping a further foil is placed on the filled mould sheet and welded thereto along the edges of the sheet and possibly also at points between the separate recesses. From an esthetic point of view as well as for welding reasons, the parts to be joined must be free of confectionery material. Such a sheet mould is not as stable as the old metal mould, nor has it the same exactitude with respect to quantity, which means that a rake device of ordinary design is unsuitable. It is further more difficult to turn the mould upside down as the material in the sheet is so pliable that the mould will easily be bent, which means that the thin shells in the recesses may be damaged. With hitherto known apparatus for the moulding of the confectionery material it has also been difficult to obtain shells with uniform thickness.

The aim of the present invention is to propose a device which makes it possible to avoid all above-mentioned disadvantages and to fill the recesses with the exact quantity required to form the shells. The operation of the device is characterized in the mould being filled to a predetermined degree with a flowing confectionery material by means of an apparatus provided with a cavity for surplus material arranged to be brought into a tight fit around the upper edge of the mould, whereafter compressed air is injected centrally into the mould through the apparatus in such a manner that the material is applied as a uniform coating of the mould surface and surplus confectionery material is forced into the cavity from which it is later removed.

The invention will below be described with reference to the accompanying drawing which schematically shows the essential parts of one embodiment of the invention.

On the drawing reference 1 denotes the main part of an apparatus for injecting confectionery material and which is provided with a spraying head 2. This is adapted during part of a working cycle to be inserted into a recess in a mould 3 and to be tightly pressed against the latter. The apparatus 1, 2 is reciprocably mounted in a support 4 and may during its movements be guided by suitable members (not shown). The support 4 is operated by means of a cam 5, which rotates about a shaft 6. The cam forces the support and also the apparatus 1, 2 carried thereby downwards against the action of springs (not shown). These springs will lift the apparatus upwards, when the pressure of the cam is relieved.

The support 4 is adapted to carry a number of similar apparatuses - one for each recess in a row across the breadth of the mould - in such a manner that simultaneous moulding may be performed in all recesses reaching the filling station during a stepwise advancement of the mould. In order to guarantee that the heads 2 of all apparatuses will be uniformly pressed against the mould 3 irrespective of variations in the distance between the support 4 and the mould 3, the main part 1 of each apparatus is vertically displaceable in an opening 7 in the support 4 into which it is fitted. The apparatus is kept in its lowermost position due to its own weight and the action of a compression spring 9 acting between the support 4 and a shoulder 8 on the main part 1.

The main part 1 consists of three concentrically arranged tubular members 10, 11 and 12. The two outer members 11 and 12 are integral or joined to a unit, whereas the inner member 10 by way of a head 10a is threaded into member 11. To facilitate the application of the central member 10 this is, above the threaded part of 10a provided with a fixed nut 10b. This will simultaneously prevent the spring 9 from withdrawing the apparatus completely from the support.

The tubular member 10 is connected to a supply for molten confectionery material. The space between members 10 and 11 just below the shoulder 8 forming a radial passage 13 connected to a supply source for compressed air, which is injected into the mould concentrically around the opening from member 10. In order to impart a rotating movement to the air a number of tangentially arranged vanes 14 are arranged around the lower part of member 10, said vanes also serving as spacing elements for separating the two members 10 and 11, respectively.

The annular passage between member 11 and 12 is at its upper end connected to a pipe 15 located immediately below passage 13. The lower end of the annular passage between members 11 and 12 communicates with a number of radially arranged passages 16 in a central part 17 of head 2. The outer ends of passages 16 are open to an annular space 18 formed between central part 17 and an annular member 19 enclosing the same and being threaded to the upper part thereof. The annular member 19 is at its inner edge provided with an integral upwardly directed flange 19a, which extends into a downwardly directed cavity in the central part. This cavity is outwardly bordered by a flange 17, which in turn extends into the cavity formed in the annular member 19, radially outside the flange 19a thereof. These two cavities together form a cavity for surplus material from the recess. The annular member 19 is furthermore provided with a sealing ring 20, which when the apparatus is brought into working position, will be forced against the mould 3 encircling a recess therein. A further sealing ring 21 is arranged between the central part 17 and the tubular member to prevent leakage between said parts.

The working of the apparatus will be described with reference to the arrangement of connected parts schematically shown on top of the drawing, it being pointed out that these parts may be substituted by equivalent parts or be arranged to cooperate with the apparatus in various manners.

The mould may, as stated earlier, be manufactured as series of depressions in a thin sheet of synthetic resin, and this mould is fed, in a stepwise fashion, past a filling station having a number of apparatuses according to the invention. When the mould rests in a suitable position, the appropriate apparatuses, through the action of cam 5 upon support 4 will be forced downwards, each apparatus extending into a recess in the mould. The head of each apparatus is thereby forced against the mould to independently seal of each recess.

Shaft 6 preferably rotates continuously and due to the shape of the cam each apparatus will remain in contact with the mould for a predetermined time. As indicated by the dash-dotted line 22, shaft 6 is connected to the shaft of a multiple valve 23. One part of this valve governs the supply of confectionery material from a receptacle 24 to the inner member 10, while an other part of the valve governs the supply of compressed air from a source 25 by way of a conduit 13a to passage 13. A third part of valve 23 governs the return flow of surplus material and excess compressed air, by way of a conduit 15a connected to pipe 15, back to the receptacle 24. A switch 26, or any corresponding pressure fluid governing member, may be connected either to the valve and adapted to govern an electric or pressure fluid motor 27 adapted to push the mould forward in a stepwise fashion in relation to the movements of the injection apparatuses.

When cam 5 during a clockwise rotation has reached the position shown on the drawing, valve 23 will open the connection between receptacle 24 and the central tubular member 10 of each apparatus by way of conduit 10c. This connection is open during a certain period of time during which a suitable portion of confectionery material is injected into each recess through the appropriate apparatuses. Immediately thereafter the connection between the compressed air source 25 and passage 13 is opened whereby air at a predetermined pressure is injected into each recess, the vanes 14 imparting a rotating movement to the still fluid confectionery material, whereby it is uniformly distributed over the walls of the recess. The passage back to receptacle 24 is open by way of tubular member 12 and pipe 15 in such a manner that surplus material is removed from the recesses in the mould, said material being forced by the air pressure to the essentially S-shaped annular cavity between the central part 17 of the head and the surrounding annular member 19 and further through the radial passages 16.

During the further movement of cam 5 the connection to member 10 is first cut off by valve 23. Thereafter the supply of compressed air is cut off, and finally the return flow conduit to receptacle 24 is closed. The pressure remaining in the recess after the air supply is interrupted will soon drop to atmospheric pressure and no back feed of confectionery material will occur from the cavity and the passage in member 12.

The apparatuses will thereafter be lifted from the mould, which will be pushed a step forwards due to the action of motor 27, and the injection operation is repeated.

Although the invention has been described and illustrated in detail, it is to be understood that this does not delimit the invention. The spirit and scope of this invention is limited only by the language of the appended claims.

I claim:

1. An apparatus for molding confectionery in open molds comprising at least one open mold; a confectionery molding device for each open mold, each device including confectionery passage means for supplying settable fluid confectionery to be sprayed in the open mold; a compressed air passage means terminating in the open mold, a spray head operatively connected to said two passage means for sealingly engaging the peripheral edge portion of the open mold, and cavity means in the spray head juxtaposed said edge portion so that the compressed air augments in forming a uniform layer of the sprayed confectionery in the open mold, the excess confectionery being removed from the open mold through said cavity means along with the compressed air.

2. An apparatus as claimed in claim 1 wherein said confectionery passage means is a central passage, one end terminating in the open mold and the other end connected to confectionery supply means; said compressed air passage means being an annular passage surrounding said central passage, one end terminating in the open mold and the other end connected to compressed air supply means; said cavity means being an annular enlarged opening in the spray head adjacent the peripheral edge of the open mold and further including a second annular passage communicating with said cavity means and a container for storing the excess confectionery.

3. An apparatus as claimed in claim 2 wherein said spray head includes a sealing ring for creating the sealing engagement and said annular enlarged opening is approximately sinusoidal in cross section.

4. An apparatus as claimed in claim 2 wherein said one end of the annular compressed air passage contains vanes positioned to cause a rotary air flow as it issues from the annular passage into the open mold.

5. An apparatus as claimed in claim 1 further including means for reciprocating the spray head into and out of engagement with the open mold.

6. An apparatus as claimed in claim 5 further including valve means for synchronizing the apparatus so that open molds are moved in a stepwise fashion into and out of operative engagement with the molding device, which in turn respectively sprays the confectionery, introduces the compressed air, and removes the excess confectionery.